United States Patent
Finch et al.

(10) Patent No.: US 9,962,731 B2
(45) Date of Patent: May 8, 2018

(54) METHACRYLIC ACID POLYMER EXTENDED UREA-FORMALDEHYDE RESIN COMPOSITION FOR MAKING FIBERGLASS PRODUCTS

(71) Applicant: Rohm and Haas Company, Philadelphia, PA (US)

(72) Inventors: William C. Finch, Ambler, PA (US); Michael D. Kelly, North Wales, PA (US); Sudhir M. Mulik, North Wales, PA (US); C. Damien Rodowski, Downingtown, PA (US)

(73) Assignee: Rohm and Haas Company, Collegeville, PA (US)

( * ) Notice: Subject to any disclaimer, the term of this patent is extended or adjusted under 35 U.S.C. 154(b) by 572 days.

(21) Appl. No.: 14/501,638

(22) Filed: Sep. 30, 2014

(65) Prior Publication Data
US 2015/0093952 A1 Apr. 2, 2015

Related U.S. Application Data

(60) Provisional application No. 61/884,517, filed on Sep. 30, 2013.

(51) Int. Cl.
| | | |
|---|---|---|
| *C08K 5/00* | (2006.01) | |
| *B05D 3/00* | (2006.01) | |
| *C08J 5/04* | (2006.01) | |
| *C08L 61/24* | (2006.01) | |
| *B32B 17/04* | (2006.01) | |
| *C08L 33/02* | (2006.01) | |

(52) U.S. Cl.
CPC .............. *B05D 3/007* (2013.01); *B32B 17/04* (2013.01); *C08J 5/043* (2013.01); *C08L 33/02* (2013.01); *C08L 61/24* (2013.01); *Y10T 442/2959* (2015.04)

(58) Field of Classification Search
None
See application file for complete search history.

(56) References Cited

U.S. PATENT DOCUMENTS

| | | |
|---|---|---|
| 5,077,361 A | 12/1991 | Hughes et al. |
| 5,670,585 A | 9/1997 | Taylor et al. |
| 5,804,254 A | 9/1998 | Nedwick et al. |
| 5,914,365 A | 6/1999 | Chang et al. |
| 6,642,299 B2 | 11/2003 | Wertz et al. |
| 6,770,169 B1 | 8/2004 | Wallace |
| 6,846,882 B2 | 1/2005 | Kroner et al. |
| 7,179,531 B2 | 2/2007 | Brown et al. |
| 8,222,167 B2 | 7/2012 | Shoemake et al. |
| 8,257,554 B2 | 9/2012 | Poggi et al. |
| 2007/0111001 A1 | 5/2007 | Bittle et al. |
| 2007/0192966 A1 | 8/2007 | Cottrell et al. |

FOREIGN PATENT DOCUMENTS

WO 2013116318 A1 8/2013

*Primary Examiner* — Robert T Butcher
(74) *Attorney, Agent, or Firm* — Steven W. Mork; Andrew E. C. Merriam

(57) ABSTRACT

The present invention provides methacrylic acid polymer modified aqueous urea formaldehyde resin (UF resin) binder compositions useful in making a treated glass mat, e.g. for roofing shingles, wherein the methacrylic acid polymer comprises the reaction product of at least 50 wt. %, based on the total weight of monomers used to make the methacrylic acid polymer, of methacrylic acid or its salts, or mixtures thereof, a water-soluble phosphorous or sulfur containing compound and the remainder of a carboxylic acid group containing monomer, such as acrylic acid. The methacrylic acid polymers have at least one of a phosphite group, hypophosphite group, phosphinate group, diphosphinate group, and/or sulfonate group and enable modified UF resins to have early strength development even when the binder compositions comprise from 0.1 to less than 5 wt. % of the polymer modifier, based on total solids of the UF resin and the polymer modifier.

10 Claims, No Drawings

METHACRYLIC ACID POLYMER EXTENDED UREA-FORMALDEHYDE RESIN COMPOSITION FOR MAKING FIBERGLASS PRODUCTS

The present invention relates to aqueous urea formaldehyde resin binder compositions comprising at least one phosphite group, hypophosphite group, phosphinate group, diphosphinate group, and/or sulfonate group containing methacrylic acid polymer modified urea-formaldehyde resin (UF resin) and methods for using the aqueous urea formaldehyde resin compositions to make fiberglass mat products.

Glass fiber mats, and fiber mats made from synthetic fibers and fiber blends find wide application in the building materials industry, for example, as insulation, as a substrate for making composite flooring, or as a substrate for making roofing shingles. Fiber mats, and especially glass fiber mats, are commonly made commercially by a wet-laid process which is carried out on what can be viewed as modified paper-making equipment. In this process, a fiber slurry is deposited on the moving screen or cylinder is processed into a sheet-like fiber mat by the removal of water, usually by suction and/or vacuum devices. This is followed by the application of a resinous or polymeric binder to the mat to hold the glass fiber mat together. After applying the binder, the mat is set or cured with heating to provide the desired mat integrity.

Widely used binder formulations for making fiber mats, especially glass fiber mats, comprise a thermosetting urea-formaldehyde (UF) resin. UF resins have commonly been employed because they are relatively inexpensive. However, the manufacture of glass fiber mats with a binder consisting essentially of a UF resin results in mats which are often brittle. And, especially as the glass fiber mats are subjected to stress during the manufacturing process, strength development at early cure times is needed to avoid process delays and shutdowns caused by breaks in the continuous mat line. So, UF resin binder compositions also may include a polymeric binder comprising an emulsion polymer or solution polymer which imparts mat strength properties to the ultimately cured mat, and can improve the mat strength early during the curing process as it is transported from its initial formation into and through the curing oven.

U.S. Pat. No. 5,670,585, to Taylor et al., discloses urea and/or phenol formaldehyde condensate resin compositions having reduced ammonia emissions and comprising from 5 to 60 wt. %, based on total resin composition solids, of acidic polyacrylates. In Taylor et al., 40 wt. % or more of the monomers used to prepare the acidic polyacrylates are unsaturated monomers containing free carboxylic acid groups. Taylor et al. urge reduction in ammonia emissions through use of a bigger proportion of the acidic polyacrylate. In those compositions, ammonia emissions and 'blue smoke' are dramatically increased as the amount urea or other nitrogenous substances approach and exceed the formaldehyde stoichiometry. Thus, any composition having a higher UF resin content would require higher levels of acidic polyacrylate to reduce ammonia emissions and it is not possible to include only a low concentration of the acidic polyacrylate, which is desirable from a cost standpoint.

The present inventors have endeavored to solve the problem of providing aqueous UF resin polymeric binder compositions providing early cure strength, i.e. meeting acceptable early cure properties wherein the amount of polymeric binder in the resin composition is reduced relative to the amount of polymeric binder used in the art UF resin compositions.

1. In accordance with the present invention, aqueous urea formaldehyde resin (UF resin) binder compositions comprise the UF resin and from 0.1 to less than 5 wt. %, preferably, from 0.5 to 4 wt. %, or, preferably, 3.5 wt. % or less or 1 wt. % or more of at least one polymer modifier, based on total solids of the UF resin and the polymer, wherein the polymer modifier is a methacrylic acid polymer that contains at least one acid group which is other than a carboxylic acid group and which is chosen from a phosphite group, hypophosphite group, phosphinate group, diphosphinate group, sulfonate group and combinations thereof, wherein the methacrylic acid copolymer is the reaction product of 50 wt. % or more, or, preferably, 60 wt. % or more, or, more preferably, 75 wt. % or more of methacrylic acid, a salt thereof, or mixtures thereof, based on the total weight of monomers used to make the methacrylic acid polymer, and the remainder of a carboxylic acid group containing monomer, and, further wherein the at least one polymer modifier has a weight average molecular weight of 16,000 or less, or, a weight average molecular weight of 2,000 or more, or, preferably, a weight average molecular weight of from 5,000 to 12,000.

2. Preferably, the aqueous urea formaldehyde resin binder composition of 1, above, comprises 5 wt. % or less, or, preferably, 0.5 wt. % or less, or, more preferably, 0.1 wt. % or less of a phenolic resin, based on total solids.

3. Preferably, the aqueous urea formaldehyde resin binder compositions of 1 or 2, above, comprise a methacrylic acid copolymer wherein the at least one acid group which is other than a carboxylic acid group is chosen from those wherein a phosphorous atom is bound to two carbon atoms, as a phosphite or phosphinate along the carbon chain, such as a dialkyl phosphinate, a terminal group, such as a hypophosphite, a pendant group, such as an alkyl phosphinate or alkyl phosphonate, and combinations thereof.

In another aspect, the present invention provides methods of making the aqueous urea formaldehyde resin binder composition in any of items 1, 2, or 3, above, the methods comprising polymerizing in aqueous media methacrylic acid or its salt, and up to 50 wt. %, or, preferably, up to 40 wt. %, or, even more preferably, up to 25 wt. %, based on the total weight of monomers used to make the methacrylic acid polymer, of a carboxylic acid group containing monomer with at least one of a water-soluble phosphorous containing compound in which the phosphorous in is the oxidation state of +3 or +1, such as hypophosphite compounds or their salts, for example, sodium hypophosphite, or water-soluble sulfur containing compounds in which the sulfur is in the oxidation state +4 or +1, such as bisulfites, or their salts, for example, such as sodium metabisulfite and combining the result of the polymerization with urea formaldehyde resin. The amounts of such water-soluble phosphorous containing compounds or sulfur containing compounds may range from 4.0 to 25 wt. %, based on the total weight of monomers used to make the methacrylic acid polymer, or, preferably, from 6.0 wt. % or more, or, 20 wt. % or less. When sulfur containing compounds are used, they may more preferably be used in the amount of from 10 to 20 wt. % based on the total weight of monomers used to make the methacrylic acid polymer.

In yet another aspect, the present invention provides methods of using the aqueous urea formaldehyde resin composition in any of items 1, 2, or 3, above, comprising applying the aqueous urea formaldehyde resin binder composition to or treating with the aqueous urea formaldehyde resin composition a wet laid continuous glass fiber mat and heating to cure the aqueous urea formaldehyde resin composition to form a treated glass mat.

In yet still another aspect of the present invention, the present invention comprises the treated glass mat made from the aqueous urea formaldehyde resin binder composition in any of items 1, 2, or 3, above, by applying to a wet laid continuous glass fiber mat or treating a wet laid continuous glass fiber mat with the aqueous urea formaldehyde resin binder composition.

In yet even still another aspect of the present invention, the aqueous urea formaldehyde resin binder compositions of the present invention in any of items 1, 2, or 3, above, have particular utility as glass mat binders for making asphalt coated roofing shingles.

Unless otherwise indicated, all temperature and pressure units are room temperature and standard pressure.

The singular forms "a," "an," and "the" include plural referents unless the context clearly dictates otherwise.

Unless defined otherwise, technical and scientific terms used herein have the same meaning as is commonly understood by one skilled in the art.

All ranges are inclusive and are combinable. Thus, for example, the disclosure of a composition which comprises 5 wt. % or less, or, preferably, 0.5 wt. % or less, or, more preferably, 0.1 wt. % or less of a phenolic resin will be read as including ranges of from 0.1 to 0.5 wt. %, from 0.1 to 5 wt. % and from 0.5 to 5 wt. %.

All phrases comprising parentheses denote either or both of the included parenthetical matter and its absence. For example, the phrase "(meth)acrylate" includes, in the alternative, acrylate and methacrylate.

As used herein, the term "aqueous" or "aqueous solvent" includes water and mixtures composed substantially of water and water-miscible solvents.

As used herein, unless otherwise indicated, the term "viscosity" refers to viscosity of a composition having the indicated solids and materials as measured on a DV-III Ultra LV Brookfield viscometer (Brookfield Engineering Laboratories, Middleboro, Mass.) at 30 rpm using spindle #31 with sample temperature maintained at a constant 25° C.

As used herein, the phrase "based on the total binder solids" refers to weight amounts of any given ingredient in comparison to the total weight amount of all of the non-volatile ingredients in the binder. Volatile ingredients include both water and ammonia as well as volatile solvents that volatilize under use conditions like lower alkanols.

As used herein, the phrase "based on the total weight of monomers used to make the polymer," refers to all addition monomers, such as, for example, carboxylic acid functional vinyl or unsaturated monomers, as well as any chain transfer agents which leave a residue in the polymer, such as the phosphorous or sulfur containing compounds or their salts.

As used herein, the phrase "binder application conditions" means conditions at ambient, or room temperature (typically 21-23° C.), and standard pressure.

Unless otherwise indicated, as used herein, the term "molecular weight" or "Mw" refers to a weight average molecular weight as determined by aqueous gel permeation chromatography (GPC) using an Agilent 1100 HPLC system (Agilent Technologies, Santa Clara, Calif.) equipped with an isocratic pump, vacuum degasser, variable injection size auto-sampler, and column heater. The detector was a Refractive Index Agilent 1100 HPLC G1362A. The software used to chart weight average molecular weight was an Agilent ChemStation, version B.04.02 with Agilent GPC-add on version B.01.01. The column set was TOSOH Bioscience TSKgel G2500PWxl 7.8 mm ID×30 cm, 7 μm column (P/N 08020) (TOSOH Bioscience USA South San Francisco, Calif.) and a TOSOH Bioscience TSKgel GMPWxl 7.8 mm ID×30 cm, 13 μm (P/N 08025) column. A 20 mM Phosphate buffer in MilliQ™ HPLC Water, pH ~7.0 was used as the mobile phase. The flow rate was 1.0 ml/minute. A typical injection volume was 20 μL. The system was calibrated using poly(acrylic acid), Na salts Mp 216 to Mp 1,100,000, with Mp 900 to Mp 1,100,000 standards from American Polymer Standards (Mentor, Ohio). As used herein, the units of Mw are grams/mole (g/mole).

As used herein, the term "use conditions" means standard pressure and temperatures ranging from the ambient temperature to the upper end of the disclosed binder cure temperature.

As used herein, the term "wt. %" stands for weight percent.

In accordance with the present invention, the phosphite group, hypophosphite group, phosphinate group, diphosphinate group, and/or sulfonate group containing methacrylic acid polymers of the present invention provide improved modified aqueous UF resin compositions. The phosphite group, hypophosphite group, phosphinate group, diphosphinate group, and/or sulfonate group containing methacrylic acid polymers of the present invention contribute to the strength of an aqueous UF resin binder treated glass mat at early cure times ("early web strength") while retaining excellent tensile strength in the fully cured mat. Meanwhile, because the compositions comprise reduced amounts of polymers and because the polymers have a relatively low weight average molecular weight (≤16,000 g/mole), the binder compositions remain at reasonable viscosity levels under application conditions throughout their application to the glass mat to ensure that the wet web surface is fully treated with binder. Full treatment or coverage of the glass mat surface area is very important. If the entire glass mat wet web is not treated uniformly with binder, any acid added to the UF resin may catalyze UF resin pre-cure which can increase the UF resin viscosity dramatically and thereby disrupt binder flow and dramatically increase the odds of glass mat web breakage. The polymer modifiers of the present invention enable the aqueous UF resin binder compositions to flow to all parts of the mat while enabling a UF resin to develop early cure strength and thereby limit the risk of a breakage of the continuous glass mat web substrate. The methacrylic acid polymer modifiers are substantially formaldehyde free. The methacrylic acid polymers prepared according to the present invention have particular utility as glass mat binders for roofing shingles.

The phosphite group, hypophosphite group, phosphinate group, and/or diphosphinate group containing methacrylic acid polymers of the present invention can be prepared by conventional aqueous solution polymerization methods, including hypophosphite chain transfer polymerization of methacrylic acid (MAA). Such polymerization methods are disclosed, for example, in U.S. Pat. No. 5,077,361 to Hughes et al. The phosphorus acid group containing catalyst can act as a chain transfer agent in such polymerizations.

The sulfonate group methacrylic acid polymers of the present invention can be prepared by conventional aqueous solution polymerization methods, including metabisulfite chain transfer polymerization of methacrylic acid (MAA). Such polymerization methods are disclosed, for example, in U.S. Pat. No. 6,846,882, to Kroner et al. wherein the sulfur in the water-soluble sulfur containing compounds is in the oxidation state +4, for example, sulfur dioxide, sulfurous acid, alkali metal, alkaline earth metal and ammonium salts of sulfurous acid or disulfurous acid, sodium, potassium, calcium or ammonium formaldehyde sulfoxylate, dialkyl sulfites, or mixtures thereof. The sulfur containing catalyst can act as a chain transfer agent in such polymerizations.

Suitable chain transfer agents used to control methacrylic acid polymer molecular weight may include, for example, water-soluble phosphorous containing compounds in which the phosphorous in is the oxidation state of +3 or +1, such as hypophosphites or their salts, such as sodium hypophosphite, and water-soluble sulfur containing compounds in which the sulfur is in the oxidation state +4 or +1, such as bisulfites, or their salts, such as sodium meta bisulfite.

Suitable "carboxylic acid group containing monomers" aside from methacrylic acid that are useful in making the polymers of the present invention may include, for example, acrylic acid, itaconic acid and maleic acid or its anhydride, preferably, acrylic acid.

The binder compositions of the present invention may comprise from 0.01 to 2 wt. %, based on the total solids of the binder compositions, of additives, including surfactants or dispersants to adjust surface tension and rheology modifiers such as hydrophobic alkali soluble emulsions (HASE) or hydrophobically modified ethoxylated urethane (HEUR) polymers to adjust viscosity.

The binder compositions of the present invention should have a viscosity of from 5 to 60 centipoises (cPs) at 25° C. at 8.0% solids, and 30 rpm of shear as measured on a DV-Ill Ultra LV Brookfield viscometer, or, preferably, 40 cPs or less, or, more preferably, 30 cPs or less.

To formulate the aqueous urea formaldehyde resin binder compositions of the present invention, the methacrylic acid polymer or resin can be added individually to the UF resin, or the methacrylic acid polymer and any additives may be supplied in the form of an additive blend.

The methods of using the aqueous urea formaldehyde resin compositions of the present invention comprise treating a wet laid fibrous glass mat with the binder composition by soaking the mat in an excess of binder solution, or by coating or impregnating binder directly into the fibrous mat, e.g. with a falling film curtain coater and then curing the binder. Curing comprises heat treating the binder treated mat at from 100 to 400° C., or, preferably, from 180 to 260° C. The product of the treating methods is referred to as a "treated glass mat".

Preferably, the treating in the method of using the aqueous urea formaldehyde resin compositions of the present invention comprises soaking the fibrous glass mat in an excess of a binder composition, or coating or impregnating binder directly into the fibrous mat, e.g. with a falling film curtain coater.

Aside from making roofing shingles, the treated glass mats of the present invention may be used as a substrate for making composite flooring, as a substrate for making siding (replacing similar sheets traditionally made using wood, cellulose or asbestos fibers), as a substrate for printed circuit boards or battery separators, as filter stock, as tape stock, as reinforcement scrim in cementitious and non-cementitious coatings for masonry, and as facing material for laminated articles such as foam composites and gypsum boards The following examples illustrate the present invention. Unless otherwise indicated, all parts and percentages are by weight and all temperatures are in ° C.

EXAMPLES

In the examples and Tables 1 and 2 that follow, the following abbreviations were used:

AA: acrylic acid, MAA: methacrylic acid, S: Styrene, MAAn: methacrylic anhydride, SMBS: sodium metabisulfite, SHP: sodium hypophosphite.

In the examples that follow, the following test methods were used.

Tensile Strength: The aqueous curable compositions were evaluated for dry and wet tensile strength on glass microfiber filter sheets (20.3×25.4 cm, Cat. No. 1820-866, Whatman International Ltd., Maidstone, England). Each sheet was dipped in each binder composition, placed between two cardboard sheets of similar dimensions, and run through a roll padder with roll pressure of 68.9 kPa (10 psi). The coated sheets were then dried by heating at 90° C. for 1.5 minutes in a Mathis oven. Post drying weight was determined to calculate binder add-on (15%+/−2% by weight binder add-on). Dried sheets were then cured in a Mathis oven at a temperature of 190° C. for 60 sec and 180 sec, as indicated. The cured sheets were cut into 2.54 cm (1 in) by 10.16 cm (4 in) strips and tested for tensile strength in the machine direction using a Thwing Albert Tensile Tester (Thwing Albert Instrument Company, West Berlin, N.J.) equipped with a 1 kN load cell. The fixture gap was 2.54 cm (1 in) and the crosshead speed was 2.54 cm/min (1 in/min). Strips were tested either "as is" at room temperature conditions (Room Temperature Tensile Strength, RT-TS) or immediately after 30 minutes of immersing in water which is maintained at a temperature of 80° C. (How-Wet Tensile Strength, HW-TS). Tensile strengths were recorded as the peak force measured during parting. Data reported are averages of values recorded from measuring 10 treated and cured strips per filter sheet for each binder composition tested. Acceptable values for Room Temperature tensile strength fully cured at 180 seconds, are those higher than 40 N, or, preferably, above 45 N. Acceptable values for How-Wet tensile strength fully cured at 180 seconds are those higher than 5.0 N, or, preferably, above 7.0 N.

In the Examples 1 to 4, the Comparative Examples 1C, 2C and 3C and the Control that follow, urea formaldehyde (UF) supplied at 65.5% solids by weight was blended with the following aqueous polymer solutions by simple mixing using a Caframo™ type RZR50 stirrer (Warton, Ontario, Calif.) equipped with a 2.54 cm diameter stirring blade and agitated to achieve a stable vortex for 10 minutes, at ambient temperature conditions. The binder was then diluted with water to a solids content of 15 wt. %:

Control Example

None;

Example 1

1 wt. % on solids of a polymethacrylic acid (homopolymer) made from 89.29 wt. % MAA, 2.68% initiator and 8.03 wt. % SHP, 5,000 Mw;

Example 2

1 wt. % on solids of a polymethacrylic acid made from 92.81 wt. % MAA, 1.39% initiator and 5.80 wt. % SHP, 10,000 Mw;

Example 3

1 wt. % on solids of a polymethacrylic acid made from 86.71 wt. % MAA, 1.46% initiator and 11.83 wt. % SMBS, 10,000 Mw;

Example 4

1 wt. % on solids of a methacrylic acid copolymer made from 42.59 wt. % AA, 50.87 wt. % MAA, 2.34% initiator and 4.20 wt. % SHP, 16,000 Mw;

Example 1C 1 wt. % on solids of a polyacrylic acid made from 85.86 wt. % AA, 0.74% initiator, 5.72 wt. % NaOH and 7.68 wt. % SMBS, 3,700 Mw;

Example 2C 1 wt. % on solids Acrysol™ G111 poly-ethylacrylate/methacrylic acid emulsion copolymer 54 EA/46MAA/NH$_4$OH, 300,000 Mw (Dow Chemical Co., Midland, Mich.); and,

Example 3C 1 wt. % on solids SMA 1000H equimolar styrene-maleic anhydride solution polymer 36% solids with 5,500 Mw, (Cray Valley HSC, Exton, Pa.)

TABLE 1

Polymeric Binder Composition and Room Temperature Tensile Strength

| Example | Polymer Composition | Chain Transfer Agent | Modifier Level, % s/s in UF resin | Molecular Wt., g/mole | RT-TS (60 sec), N | Std Dev., N | RT-TS (180 sec), N | Std. Dev., N |
|---|---|---|---|---|---|---|---|---|
| Control | — | — | — | — | 35.7 | 7.3 | 37.3 | 5.6 |
| 1 | p-MAA | SHP | 1 | 5,000 | 49.4 | 8.8 | 57.5 | 6.5 |
| 2 | p-MAA | SHP | 1 | 10,000 | 54.8 | 1.46.3 | 59.6 | 5.0 |
| 3 | p-MAA | SMBS | 1 | 10,000 | 52.0 | 4.9 | 51.6 | 8.9 |
| 4 | p-MAA | SHP | 1 | 16,000 | 42.7 | 9.5 | 44.9 | 6.4 |
| 5 | p-AA/MAA | SHP | 1 | 9,500 | 47.9 | 7.3 | 53.4 | 8.1 |
| 1C | p-AA | SMBS | 1 | 3,700 | 46.1 | 4.3 | 47.9 | 4.7 |
| 2C | EA/MAA | SMBS | 1 | 300,000 | 38.5 | 19.4 | 50.9 | 6.4 |
| 3C | Sty/MAAn | — | 1 | 1,000 | 45.5 | 3.4 | 46.9 | 5.8 |

TABLE 2

Hot-Wet Tensile Strength

| Example | HW-TS$_t$ (60 sec), N | Std. Dev., N | HW-TS$_t$ (180 sec), N | Std. Dev., N |
|---|---|---|---|---|
| Control | 1.5 | 0.8 | 4.6 | 1.2 |
| 1 | 3.8 | 1.2 | 10.4 | 1.9 |
| 2 | 6.7 | 1.0 | 11.6 | 1.9 |
| 3 | 3.6 | 0.5 | 5.5 | 1.8 |
| 4 | 2.8 | 0.6 | 7.5 | 1.8 |
| 5 | 4.2 | 1.2 | 10.8 | 2.8 |
| 1C | 1.8 | 0.7 | 4.4 | 1.5 |
| 2C | 3.0 | 1.2 | 8.9 | 1.8 |
| 3C | 2.0 | 0.8 | 4.6 | 0.8 |

As shown in Tables 1 and 2, above, the inventive methacrylic acid polymers of Examples 1, 2, 3 and 4 when used in very low proportions of 1 wt. % based on total polymer and UF resin solids, gives at least the room temperature tensile strength of any of the polymers in Comparative Examples 1C, 2C and 3C; however, the Inventive Examples 1, 2, 3 and 4 all exhibit superior hot wet tensile strength when compared to the Comparative Examples with no phosphorus acid group or sulfonate group containing polymer. Observed with a range of phosphorus acid group containing methacrylic acid polymers and copolymers having a range of molecular weights, especially in the preferred 4,000 to 12,000 range, the improved hot wet tensile strength is particularly strong after just 60 seconds of cure. This data suggests the invention enables the desired development of early cure strength during the processing of glass mats made with the binder compositions.

In comparison to the comparative Example 1C and 3C solution polymers which are water soluble polymers, it is not expected that one would see the improved hot wet tensile strength shown in inventive Example 2 where the polymer modifier is a solution polymer.

We claim:

1. An aqueous urea formaldehyde resin (UF resin) binder composition comprising the UF resin and from 0.1 to less than 5 wt. % of at least one polymer modifier, based on total solids of the UF resin and the polymer, wherein the polymer modifier is a methacrylic acid polymer that contains at least one acid group which is other than a carboxylic acid group and which is chosen from a phosphite group, hypophosphite group, phosphinate group, diphosphinate group, sulfonate group and combinations thereof, wherein the methacrylic acid polymer is the reaction product of 50 wt. % or more of methacrylic acid, a salt thereof, or mixtures thereof, based on the total weight of monomers used to make the methacrylic acid polymer up to 40 wt %, based on the total weight of monomers used to make the methacrylic acid polymer, of a carboxylic acid group containing monomer group consisting of acrylic acid, itaconic acid and maleic acid or its anhydride, and 4.0 to 25 wt %, based on total weight of monomer used to make the methacrylic acid polymer, of a water soluble phosphorous containing compound having an oxidation state of +3 or +1 or sulfur containing compounds having an oxidation state +4 or +1; and, further wherein the at least one polymer modifier has a weight average molecular weight of from 2,000 to 16,000.

2. The aqueous urea formaldehyde resin (UF resin) binder composition as claimed in claim 1, wherein the methacrylic acid polymer is the reaction product of 60 wt. % or more of methacrylic acid, a salt thereof, or mixtures thereof, based on the total weight of monomers used to make the methacrylic acid polymer.

3. The aqueous urea formaldehyde resin (UF resin) binder composition as claimed in claim 1, wherein the at least one polymer modifier has a weight average molecular weight of from 5,000 to 12,000.

4. The aqueous urea formaldehyde resin (UF resin) binder composition as claimed in claim 1, wherein the at least one polymer modifier is a methacrylic acid copolymer wherein the at least one acid group which is other than a carboxylic acid group is chosen from a group wherein a phosphorous atom is bound to two carbon atoms along the carbon chain, a terminal group, a pendant alkyl phosphinate, a pendant alkyl phosphonate, and combinations thereof.

5. A method of making an aqueous urea formaldehyde resin (UF resin) binder composition comprising the UF resin and from 0.1 to less than 5 wt. % of at least one methacrylic acid polymer modifier, based on total solids of the UF resin and the polymer modifier, wherein the polymer modifier is a methacrylic acid polymer that contains at least one acid group which is other than a carboxylic acid group and which is chosen from a phosphite group, hypophosphite group, phosphinate group, diphosphinate group, sulfonate group and combinations thereof, comprising;

polymerizing in aqueous media a mixture of 50 wt. % or more of methacrylic acid or its salt, based on the total weight of monomers used to make the methacrylic acid polymer, up to 40 wt %, based on the total weight of monomer used to make the methacrylic acid polymer, of a carboxylic acid group containing monomer selected from a group consisting of acrylic acid, itaconic acid and maleic acid or its anhydride, and from 4.0 to 25.0 wt. %, based on the total weight of monomers used to make the methacrylic acid polymer, of at least one of a water-soluble compound chosen from a phosphorous containing compound in which the phosphorous is in the oxidation state of +3, a phosphorous containing compound in which the phosphorous is in the oxidation state of +1, a sulfur containing compound in which the sulfur is in the oxidation state of +4, a sulfur containing compound in which the sulfur is in the oxidation state of +1, and their salts; and, combining the result of the polymerization with urea formaldehyde resin.

6. The method of making an aqueous urea formaldehyde resin (UF resin) binder composition as claimed in claim 5, wherein the amount of the water-soluble compound ranges from 6.0 wt. % to 20 wt. %.

7. The method of making an aqueous urea formaldehyde resin (UF resin) binder composition as claimed in claim 5, wherein the water-soluble compound is chosen a hypophosphite compound, a bisulfite, a metabisulfite, and salts thereof.

8. The method of making an aqueous urea formaldehyde resin (UF resin) binder composition as claimed in claim 5, wherein the amount of the methacrylic acid polymer modifier ranges from 0.5 to less than 5 wt. % of at least one polymer modifier, based on total solids of the UF resin and the polymer modifier.

9. A method of using the aqueous urea formaldehyde resin (UF resin) binder composition as claimed in claim 1, comprising;

applying the aqueous urea formaldehyde resin binder composition to or treating with the aqueous urea formaldehyde resin composition a wet laid continuous glass fiber mat; and, heating to cure the aqueous urea formaldehyde resin composition to form a treated glass mat.

10. A treated glass mat made by the method as claimed in claim 9.

* * * * *